United States Patent Office 3,655,759
Patented Apr. 11, 1972

3,655,759
PROCESS FOR THE PREPARATION OF CYCLOHEXANONE OXIME
Walter Krönig and Johann Grolig, Leverkusen, Germany, assignors to Farbenfabriken Bayer Aktiengesellschaft, Leverkusen, Germany
No Drawing. Continuation of application Ser. No. 622,064, Mar. 10, 1967. This application Nov. 13, 1969, Ser. No. 871,587
Claims priority, application Germany, Mar. 19, 1966, F 48,711
Int. Cl. C07c *131/04*
U.S. Cl. 260—566 A                                8 Claims

ABSTRACT OF THE DISCLOSURE

Production of optionally alkyl - substituted cyclohexanone oxime by reacting the corresponding cyclohexanone with ammonia and hydrogen peroxide in aqueous phase in the presence of a tungsten catalyst at a temperature between about $-20$ to $+50°$ C., with both the starting cyclohexanone compound and the ammonia being used in molar excess with respect to the amount of hydrogen peroxide used.

---

This application is a streamline continuation of copending U.S. application Ser. No. 622,064, filed Mar. 10, 1967, now abandoned.

This invention relates to and has for its objects a process for the preparation of cyclohexanone oxime, and derivatives thereof.

It has now been found in accordance with the present invention that optionally alkyl-substituted cyclohexanone oxime can be obtained by reacting optionally alkyl-substituted cyclohexanone with ammonia and hydrogen peroxide in an aqueous medium at a temperature of from $-20°$ C. to $50°$ C., preferably at a temperature of from $0°$ C. to $20°$ C., both the cyclohexanone and the ammonia being used in excess in relation to the hydrogen peroxide. The reaction may be carried out at a normal or at an elevated pressure, and preferably in the presence of catalysts, for which purpose water-soluble tungsten compounds have proved to be particularly suitable (tungstates) for example.

In order to carry out the new process, the reactants are preferably intimately mixed together, for which purpose various procedures can be adopted. For example, an aqueous solution of the hydrogen peroxide may be introduced together with the cyclohexanone into a vigorously stirred ammoniacal solution of the tungstate. It is however, also possible to introduce an aqueous hydrogen peroxide and an ammoniacal tungstate solution into the vigorously stirred cyclohexanone. Equally, it is possible to introduce the solutions into circulated cyclohexanone, and to remove an appropriate quantity of the reaction products from this circuit. In this case, the aqueous solutions are also circulated with the cyclohexanone. A number of such series-arranged loop reactors, may be used and the aqueous solutions may be introduced at various points along this series of reactors, in which case the two aqueous solutions may even be introduced at different points. Alternatively, the aqueous solutions of ammonia, ammonium tungstate and hydrogen peroxide may even be allowed to flow down through a column filled with the cyclohexanone, in which case it is of advantage to ensure that the aqueous solutions flowing through the reactor are thoroughly mixed with the cyclohexanone already present in it. The organic phase is removed at the upper end of the reactor and the aqueous phase at the lower end. However, the reverse procedure may also be used, the vertical reactor being filled with the aqueous phase of the three reactants and the cyclohexanone being allowed to ascend through the aqueous phase. The residence times of the reactants may vary, for example, between 10 and 100 minutes, advantageously between 20 and 50 minutes. It is of advantage to select such reaction times that almost all the hydrogen peroxide has been consumed by the time the reaction is over.

The ammonia required for the reaction is advantageously introduced in anhydrous form preferably into the tungstate solution. The hydrogen peroxide may be used, for example, in the form of a 5% to 60%, advantageously 10% to 20% aqueous solution.

The cyclohexanone excess may amount, for example, to between about 2 and 10, and preferably to between 2 and 5, mols of the ketone per mol of the hydrogen peroxide. Similarly, the ammonia excess may amount, for example, to between about 5 and 20, and preferably to between 5 and 15, mols of ammonia per mol of hydrogen peroxide. The excess both of the cyclohexanone and of the ammonia preferably amounts to at least 1 mol in each case. The compounds used as catalysts for the reaction, preferably the tungsten compounds, are advantageously used in the form of water-soluble salts, preferably ammonium or alkali metal salts, of tungstic acid or its heteropoly-acids such as, for example, phosphotungstic acid or borotungstic acid. Mixtures of any of such catalyst salts may also be used. It is of advantage to work with aqueous solutions which are saturated with the salts under the reaction conditions.

It may be of advantage to add small quantities of stabilisers for hydrogen peroxide to the reactants, including aminopolycarboxylic acid alkali metal and/or ammonium salts, and particularly the corresponding polyloweralkanoyloxy salts, and mixtures thereof, such as for example, the sodium salts of nitrilotriacetic acid or of ethylene diamine tetraacetic acid, for example, in quantities of between 10 and 500 p.p.m., based on the aqueous solution.

In carrying out the process, precautions must obviously be taken to ensure that the materials or apparatus used do not catalytically decompose the hydrogen peroxide under the reaction conditions. For example, tantalum, titanium, and stainless steels are suitable, as are quartz, silicates or plastics, for example, polyethylene or polypropylene.

As already mentioned, it is of advantage to carry out the process in such a way that most of the hydrogen peroxide introduced is reacted.

The reaction products can be worked up in different ways. It is of advantage initially to separate the phases providing they have not already been separated by the countercurrent process in the reactor. For example, the organic phase is subjected to distillation with steam, in which case precautions are taken to ensure that an aqueous phase remains intact at the bottom of the distillation column. Distillation may be carried out either at normal pressure or at reduced pressure. During distillation, the cyclohexanone flows off from the head of the column as a water-azeotrope, whilst the cyclohexanone oxime formed remains in the bottom of the column from which it can be directly isolated. If desired, the cyclohexanone oxime may be recrystallised in organic solvents. The cyclohexanone obtained as distillate is recycled. The water introduced into the reaction is removed from the aqueous phase. This can be done by distillation in the normal sense or by azeotropic distillation with an organic product such as cyclohexanone, for example. In this form of distillation, the ammonia simultaneously distills over. It is recovered form the distillate in a conventional manner, and recycled.

The invention is illustrated without limitation by the following examples:

EXAMPLE 1

30 g. of an aqueous 11.2% hydrogen peroxide solution, corresponding to 3.36 g. of $H_2O_2$ (0.099 mol) and 46.0 g. of cyclohexanone (0.47 mol) were introduced with vigorous stirring over a period of 30 minutes into 95 g. of an aqueous solution containing 11 g. of ammonium tungstate, 500 p.p.m. of the sodium salt of ethylene-diaminotetracetic acid and 21 g. of ammonia (1.24 mols). The reaction mixture was kept between 0° C. and 5° C. by external cooling, and the reaction was carried out at normal pressure. After the reactants had been mixed together, all the hydrogen peroxide introduced and 9.0 g. of the cyclohexanone introduced had reacted. Any unreacted ammonia and cyclohexanone were distilled off from the reaction mixture under reduced pressure, some of the water also distilling over. The cyclohexanone oxime formed was taken up in ether from the distillation residue, the ether was distilled off and the crude oxime was recrystallised from petroleum ether. 10.2 g. of pure cyclohexanone oxime were obtained, corresponding to a molar yield of 91% of the hydrogen peroxide used.

EXAMPLE 2

The procedure was as in Example 1 except that the ammonium tungstate had been replaced by an equivalent quantity of ammonium phosphotungstate. In this case, too, all the hydrogen peroxide introduced was reacted. Of the cyclohexanone added, 8.1 g. had reacted.

9.2 g. of pure cyclohexanone oxime were obtained, corresponding to a molar yield of 85% of the hydrogen peroxide used.

EXAMPLE 3

The procedure was as in Example 1, except that the ammonium tungstate had been replaced by an equivalent quantity of ammonium borotungstate. In this case, too, all the hydrogen peroxide introduced was reacted and, of the cyclohexanone added, 8.2 g. had reacted.

9.4 g. of pure cyclohexanone oxime were obtained, corresponding to a molar yield of 87% of the hydrogen peroxide used.

EXAMPLE 4

A glass reaction tube 40 centimetres long with an effective capacity of 0.265 litre was used for continuously carrying out the reaction described in Examples 1 to 3. This reaction tube contained an axially arranged shaft carrying four blades of stainless steel which were vertically separated from one another by stainless steel wire gauzes, in such a way that each agitation zone was followed by a quiescent zone. The reaction temperature was kept at 0° C. through external cooling by means of a cooling jacket filled with ice-water. The reactants were continuously introduced through suitably arranged inlets and the reaction product was continuously removed on completion both of the reaction and of phase separation. The following procedure was adopted. The cyclohexanone was pumped into the lower third of the reactor and the aqueous ammonia solution in which the tungstate catalyst was dissolved (catalyst according to Example 1) was pumped into the upper third of the reactor. The dilute hydrogen peroxide was introduced into the centre of the apparatus. The cyclohexanone phase flowed upwards and was removed at the upper end of the reactor whilst the aqueous phase (hydrogen peroxide and ammonical tungstate solution) flowed downwards and was removed at the lower end of the reactor. In other words, the reaction took place in countercurrent.

382 g. of an aqueous ammonia solution containing 90 g. (5.29 mols) of ammoia and 22 g. of ammonium tungstate in homogeneous solution, were introduced into the reactor per hour. The 11.7% hydrogen peroxide was introduced in a quantity of 124 g. per hour (0.427 mol $H_2O_2$). This solution contained 500 p.p.m. of the sodium salt of ethylene-diaminotetracetic acid as a peroxide stabiliser. 190 g. (1.94 mols) of cyclohexanone were pumped through per hour. The average residence time was 22 minutes.

No more hydrogen peroxide could be detected in the phases removed. Of the cyclohexanone introduced, 42 g. per hour had reacted. Working-up of the combined phases as described in Example 1 produced 47.8 g. of pure cyclohexanone oxime for a balance time of one hour, corresponding to a molar yield of 99% of the hydrogen peroxide used. The cyclohexanoneoxime production amounted to 180 g./litre per hour.

EXAMPLE 5

The apparatus and arrangement of Example 4 were used, the only difference being that the residence time inside the reactor was increased to 47 minutes by varying the hourly throughputs of reactants.

192 g. of an aqueous ammonia solution containing 11 g. of ammonium tungstate and 45.2 g. of ammonia (2.66 mols), 60 g. of and 11.7% hydrogen peroxide solution (0.207 mol $H_2O_2$) stabilised as in Example 4 and 95 g. of cyclohexanone (0.97 mol) were pumped through the reactor, cooled to 0° C., every hour. 20.5 g. of cyclohexanone and all the hydrogen peroxide were reacted in the balance time of one hour. 23.2 g. of pure cyclohexanone oxime were obtained, corresponding to a molar yield of 99%, based on the hydrogen peroxide used.

EXAMPLE 6

The reactants were pumped through the apparatus of Example 4 at 0° C. at such a rate that a residence time of 15 minutes was obtained. The molar ratios of the reactants corresponded to those of Example 4, the molar yield of pure cyclohexanone oxime, based on the hydrogen peroxide used, amounting to 77% for a space-time yield of 192 g. of cyclohexanone oxime per litre per hour.

EXAMPLE 7

The continuous reaction was carried out as in Example 4 in the apparatus described above, the only difference being that the temperature inside the reactor was lowered to −10° C. by cooling with brine. The molar yield of pure cyclohexanone oxime amounted to 88%, based on the hydrogen peroxide used which, even at −10° C., had been quantitatively reacted. The cyclohexanone oxime production was found to be 141 g. per litre per hour.

EXAMPLE 8

The procedure was as in Example 4, except that the reaction temperature was increased to 20° C. In a quantitative reaction of the hydrogen peroxide, 75 mol percent had been reacted to cyclohexanone oxime. The cyclohexanone oxime production amounted to 136 g. per litre per hour.

EXAMPLE 9

The apparatus and procedure were as described in Example 4, except that the hourly throughput of cyclohexanone was lowered to 2.8 mols of cyclohexanone per mol of hydrogen peroxide, whereas, in the preceding examples, this ratio was between 4 and 5 mols of cyclohexanone per mol of hydrogen peroxide.

80 mol percent of cyclohexanone oxime, based on the hydrogen peroxide used, were obtained at a reaction temperature of 0° C. and a residence time of 21 minutes. An oxime production of 161 g. per litre per hour was obtained.

EXAMPLE 10

The procedure was as in Example 4, except that the molar ratio of cyclohexanone to hydrogen peroxide was increased to 6.8. 99 mol percent of cyclohexanone oxime based on the hydrogen peroxide used, were obtained at a temperature of 0° C. and a residence time of 23 minutes. The cyclohexanone oxime production amounted to 133 g. per litre per hour.

EXAMPLE 11

The procedure was as in Example 1 except that the cyclohexanone of Example 1 had been replaced by the equivalent quantity (52.5 g.) of 4-methyl-cyclohexanone. All the hydrogen peroxide introduced was reacted. Of the 4-methyl-cyclohexanone added, 6.0 g. had reacted. 6.6 g. of 4-methyl-cyclohexanone oxime were obtained corresponding to a molar yield of 53% of the hydrogen peroxide used.

EXAMPLE 12

The procedure was as in Example 1 except that the cyclohexanone of Example 1 had been replaced by the equivalent quantity (72.4 g.) of 4 - tert.-butyl-cyclohexanone (M.P. 49° C.), which had been obtained by chromic acid oxidation of the corresponding alcohol. The ketone was added as ethereal solution (50 weight percent). All the hydrogen peroxide introduced was reacted. Of the 4 - tert.-butyl-cyclohexanone added 7.5 g. had reacted. 8.4 g. of 4 - tert.-butyl-cyclohexanone oxime were obtained (M.P. 136–138° C.) corresponding to a molar yield of 50% of the hydrogen peroxide used.

EXAMPLE 13

The procedure was as in Example 1 except that the cyclohexanone of Example 1 had been replaced by the equivalent quantity of (59.2 g.) of 3,5-dimethyl-cyclohexanone, which had been obtained by catalytic hydrogenation of 3,5-xylenol-1 and subsequent chromic acid oxidation of the corresponding alcohol. All the hydrogen peroxide introduced was reacted. Of the 3,5-dimethyl-cyclohexanone 10.2 g. had reacted.

11.5 g. of 3,5 - dimethyl - cyclohexanone oxime (M.P. 63–65° C.) were obtained corresponding to a molar yield of 82% of the hydrogen peroxide used.

EXAMPLE 14

Example 13 was repeated in the manner of Example 4 carrying out the reaction continuously. In this case, too, 3,5 - dimethylcyclohexanone oxime was obtained in a molar yield of 80% of the hydrogen peroxide used.

Cyclohexanone oxime and its alkyl derivatives are valuable intermediates for polyamides. It is well known that the acid catalysed rearrangement of cyclohexanone oxime is the main source of caprolactam which is converted to nylon-6 by polycondensation. By similar reactions the alkyl-substituted caprolactams are obtained from the alkyl-substituted cyclohexanone oximes and are converted to alkyl-substituted nylon-6 types with specially valuable uses.

What is claimed is:

1. Process for the preparation of a cyclohexanone oxime, which comprises reacting a cyclohexanone compound selected from the group consisting of cyclohexanone, lower alkyl cyclohexanone, and mixtures thereof, with ammonia and hydrogen peroxide in aqueous medium in the presence of a water-soluble tungsten catalyst selected from the group consisting of tungstic acid ammonium salt, tungstic acid alkali metal salts, heteropolytungstic acid ammonium salts, heteropolytungstic acid alkali metal salts and mixtures thereof at a temperature between about —20 to +50° C., with both said cyclohexanone compound and ammonia being used in molar excess with respect to the amount of hydrogen peroxide used.

2. Process according to claim 1 wherein said cyclohexanone compound used is cyclohexanone and the reaction is carried out at a temperature between about 0 and 20° C.

3. Process according to claim 1 wherein between about 2–10 mols of cyclohexanone compound are used per mol of hydrogen peroxide.

4. Process according to claim 1 wherein between about 5–20 mols of ammonia are used per mol of hydrogen peroxide.

5. Process for the preparation of cyclohexanone oxime according to claim 1, which comprises reacting cyclohexanone with ammonia and hydrogen peroxide in aqueous medium in the presence of a water-soluble tungsten catalyst selected from the group consisting of tungstic acid ammonium salt, tungstic acid alkali metal salt, heteropolytungstic acid ammonium salt, heteropolytungstic acid alkali metal salt, and mixtures thereof, at a temperature between about —20 to +50° C., in a ratio of between about 2–10 mols of cyclohexanone and 5–20 mols of ammonia per mol of hydrogen peroxide, and recovering the cyclohexanone oxime thereby formed.

6. Process according to claim 5 wherein the reaction is carried out at a temperature between about 0 and 20° C.

7. Process according to claim 6 wherein the hydrogen peroxide is used in the form of a 5–60% aqueous solution and the reaction is carried out in the presence of a stabilizer for the hydrogen peroxide selected from the group consisting of aminopolycarboxylic acid alkali metal salt, aminopolycarboxylic acid ammonium salt, and mixtures thereof.

8. Process according to claim 1 for the preparation of a cyclohexanone oxime, which comprises reacting a cyclohexanone compound selected from the group consisting of cyclohexanone, lower alkyl cyclohexanone, and mixtures thereof, with ammonia and hydrogen peroxide in aqueous medium in the presence of a water-soluble tungsten catalyst selected from the group consisting of tungstic acid ammonium salt, tungstic acid alkali metal salts, heteropolytungstic acid ammonium salts, heteropolytungstic acid alkali metal salts and mixtures thereof at a temperature between about —20 to +50° C., with both said cyclohexanone compound and ammonia being used in a molar excess of at least 1 mol each per mol of hydrogen peroxide used.

References Cited

Lebedev et al., Journal of General Chemistry, U.S.S.R., vol. 30, pp. 1629–1633 (1960).

LEON ZITVER, Primary Examiner

G. A. SCHWARTZ, Assistant Examiner